United States Patent
Kao et al.

(10) Patent No.: US 10,302,853 B2
(45) Date of Patent: May 28, 2019

(54) BACK PLATE ASSEMBLY AND BACKLIGHT MODULE

(71) Applicant: Radiant Opto-Electronics Corporation, Kaohsiung (TW)

(72) Inventors: Min-Jui Kao, Kaohsiung (TW); Yung-Chieh Chao, Kaohsiung (TW); Teng-Yi Huang, Kaohsiung (TW); Chien-Hung Chen, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/968,766

(22) Filed: May 2, 2018

(65) Prior Publication Data

US 2018/0246272 A1    Aug. 30, 2018

Related U.S. Application Data

(63) Continuation of application No. 14/527,757, filed on Oct. 29, 2014, now Pat. No. 9,989,695.

(30) Foreign Application Priority Data

May 23, 2014   (TW) .............................. 103118131 A

(51) Int. Cl.
  *G02F 1/1333*    (2006.01)
  *F21V 8/00*     (2006.01)
  *G02F 1/13357*   (2006.01)

(52) U.S. Cl.
  CPC ......... *G02B 6/0088* (2013.01); *G02B 6/0091* (2013.01); *G02F 1/1336* (2013.01); *G02B 6/0068* (2013.01); *G02F 2001/133317* (2013.01); *G02F 2001/133322* (2013.01)

(58) Field of Classification Search
  CPC ................ G02B 6/0088; G02B 6/0086; G02F 2001/133317
  See application file for complete search history.

(56) References Cited

U.S. PATENT DOCUMENTS

| | | | |
|---|---|---|---|
| 2006/0262570 A1* | 11/2006 | Kang .................... | G02B 6/0088 362/632 |
| 2008/0158471 A1* | 7/2008 | Fu ...................... | G02F 1/133308 349/60 |
| 2013/0308074 A1* | 11/2013 | Park ...................... | G02B 6/0088 349/58 |
| 2014/0112021 A1* | 4/2014 | Wang .................... | G02B 6/0088 362/633 |
| 2016/0011364 A1* | 1/2016 | Horiguchi ......... | G02F 1/133606 362/606 |

FOREIGN PATENT DOCUMENTS

| CN | 1407379 A | 4/2003 |
|---|---|---|
| CN | 1779520 A | 5/2006 |
| CN | 101149530 A | 3/2008 |
| CN | 102829443 A | 12/2012 |

\* cited by examiner

*Primary Examiner* — Sean P Gramling
(74) *Attorney, Agent, or Firm* — CKC & Partners Co., LLC

(57) ABSTRACT

A back plate assembly and a backlight module are provided. The back plate assembly includes a back plate, at least one optical film and at least one fixing member. The back plate includes a bottom plate and a sidewall. The optical film is disposed on the bottom plate. The fixing member includes a main body and a protruding member. At least one portion of the main body overlaps with the sidewall. The protruding member is disposed on the main body and is combined with the optical film.

13 Claims, 13 Drawing Sheets

BACK PLATE ASSEMBLY AND BACKLIGHT MODULE

RELATED APPLICATIONS

This application is a continuation application of U.S. application Ser. No. 14/527,757, filed on Oct. 29, 2014, which claims priority to Taiwan Application Serial Number 103118131, filed May 23, 2014, which is herein incorporated by reference.

BACKGROUND

Field of Invention

The present invention relates to a light source assembly. More particularly, the present invention relates to a back plate assembly and a backlight module.

Description of Related Art

Referring to FIG. 1A, FIG. 1A is a schematic structural diagram showing a conventional back plate and a block. In a conventional backlight module, for securing optical films, a block 920 is disposed in the back plate 910. A pillar 920a is disposed on the block 920 for engaging with the optical films. However, because the strength of the block 920 is poor, the pillar 920a is easily to be broken and fails to fix the optical films effectively. In addition, the block 920 itself has a certain thickness, which is disadvantageous to the narrow frame design of the backlight module.

Simultaneously referring to FIG. 1B, FIG. 1B is a schematic structural diagram showing a conventional back plate and a positioning post. Another way to fix the optical films is to dispose a positioning post 940 on the back plate 930. Before the positioning post 940 is disposed, plural through holes 930a have to be disposed on the back plate 930. Therefore, the positioning post 940 can pass through the through hole 930a to be fixed on the back plate 930. Although the positioning post 940 occupies a space smaller than the block 920, yet when being formed on the back plate 930, the through holes 930a for mounting the positioning post 940 have to be spaced at a distance from an edge of the back plate 930 due to the limitation of the processing technique. Therefore, it is disadvantageous to shrinking the frame width of the backlight module. In addition, the through hole 930a disposed on the back plate 930 will seriously affect the appearance of the back plate 930.

SUMMARY

One object of the present invention is to provide a back plate assembly and a backlight module, in which a fixing member having a guiding groove and a fixing portion is used to fix an optical film and a light guide plate on a back plate. Moreover, a slot corresponding to the fixing portion is disposed on the back plate. Therefore, when the fixing member is disposed on the back plate, a sidewall of the back plate can be fixed in the guiding groove, and the fixing portion can fill in the space of the slot, so as to achieve an effect of saving the space and increasing the strength of the back plate.

Another object of the present invention is to provide a back plate assembly and a backlight module, the injection molding manner is used to form the fixing member of the present invention for combining a protruding member having higher strength with a main body, so as to increase the overall strength of the fixing member and the reliability of the optical film disposed on the fixing member.

According to the aforementioned objects, a back plate assembly is provided. The back plate assembly includes a back plate, at least one optical film and at least one fixing member. The back plate includes a bottom plate and a sidewall. The optical film is disposed on the bottom plate. The fixing member includes a main body and a protruding member. At least one portion of the main body overlaps with the sidewall. The protruding member is disposed on the main body and is combined with the optical film.

According to the aforementioned objects, another back plate assembly is provided. The back plate assembly includes a back plate, at least one optical film and at least one fixing member. The back plate includes a bottom plate and a sidewall. The optical film is disposed on the bottom plate. The fixing member includes a main body and a protruding member. The main body is disposed between the sidewall and the optical film. The protruding member is disposed on the main body and is combined with the optical film.

According to an embodiment of the present invention, the fixing member is movable along a direction towards the bottom plate so as to be combined with the bottom plate, and the protruding member of the fixing member extends along a direction away from the bottom plate so as to be combined with the optical film.

According to an embodiment of the present invention, the protruding member has a length and a width, and an extending direction of the length is parallel to an extending direction of the sidewall.

According to an embodiment of the present invention, the optical film has a through hole with a length, in which an extending direction of the length of the through hole is parallel to the extending direction of the length of the protruding member.

According to an embodiment of the present invention, the through hole of the optical film has a width, and the width of the through hole is greater than the width of the protruding member.

According to an embodiment of the present invention, the protruding member is a metal plate, and the main body is combined with the protruding member by an injection molding manner.

According to an embodiment of the present invention, the sidewall of the back plate is connected to the bottom plate of the back plate, and at least one slot is disposed on the bottom plate or the sidewall of the back plate, in which the main body has a guiding groove and at least one fixing portion, the sidewall is fixed in the guiding groove, and the fixing portion is fixed in the slot.

According to an embodiment of the present invention, the main body includes a top surface, a bottom surface and a side surface. The protruding member protrudes from the top surface. The bottom surface is opposite to the top surface, in which the fixing portion protrudes from the bottom surface, and the slot of the back plate is disposed on the bottom plate corresponding to the fixing portion. The side surface connecting the top surface to the bottom surface, in which the guiding groove is a recess portion formed at the side surface.

According to an embodiment of the present invention, the main body includes a projection disposed on the top surface.

According to an embodiment of the present invention, the main body includes an inserting member disposed on bottom surface, and the inserting member is correspondingly inserted into an insert hole on the bottom plate.

According to an embodiment of the present invention, the main body includes a top surface and a first side surface. The protruding member protrudes from the top surface. A first side surface is connected to the top surface. At least one fixing portion and an extending portion respectively protrudes from the first side surface, in the slot of the back plate is disposed on the sidewall corresponding to the fixing portion, and the guiding groove is formed at the extending portion.

According to an embodiment of the present invention, the slot of the back plate includes a positioning portion and a taper portion connected to the positioning portion, and the fixing portion is elastic and deformable by being compressed by the taper portion, so as to be fixed in the positioning portion by a resilient recovery force.

According to the aforementioned objects, a back plate assembly is provided. The back plate assembly includes the aforementioned back plate assembly, a light guide plate and a light source. The light guide plate is disposed between the bottom plate and the optical film, in which the light guide plate includes at least one flange lug extending from a side edge of the light guide plate, and the flange lug is staggered arranged with the protruding member. The light source disposed is adjacent to a light-incident surface of the light guide plate.

According to the aforementioned objects, another back plate assembly is provided. The back plate assembly includes the aforementioned back plate assembly, a light guide plate and a light source. The light guide plate is disposed between the bottom plate and the optical film, in which the light guide plate abuts against the main body. The light source disposed is adjacent to a light-incident surface of the light guide plate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
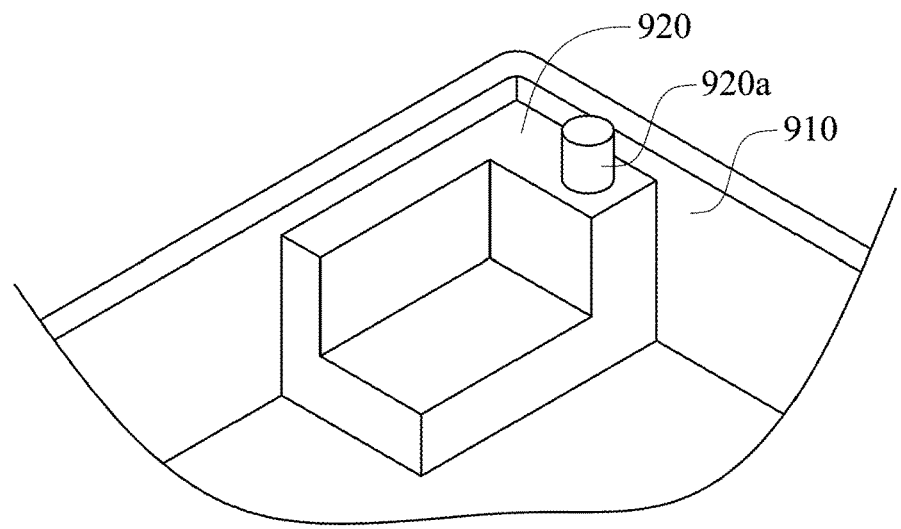
FIG. 1A is a schematic structural diagram showing a conventional back plate and a block.
Figure 1B:
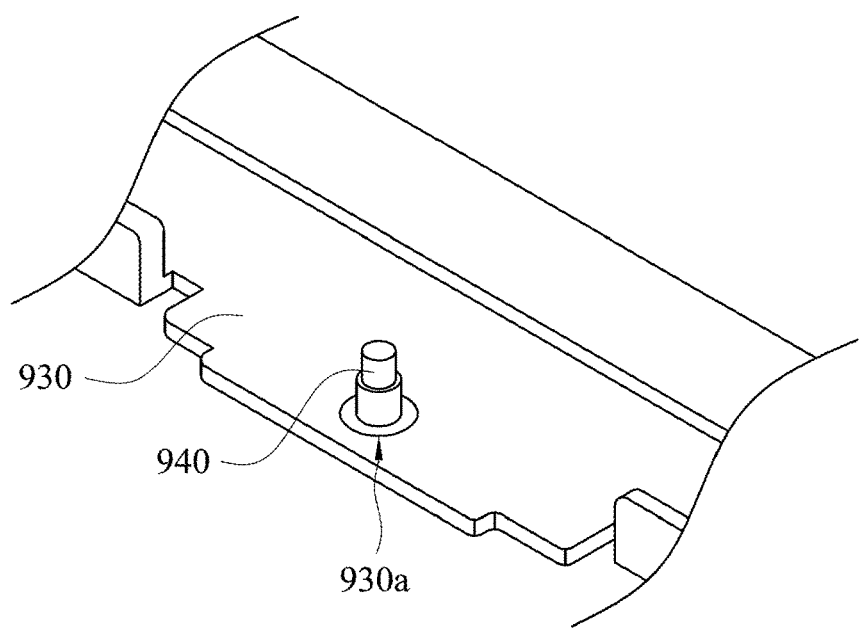
FIG. 1B is a schematic structural diagram showing a conventional back plate and a positioning post.

Reference will now be made in detail to the present embodiments of the invention, examples of which are illustrated in the accompanying drawings. Wherever possible, the same reference numbers are used in the drawings and the description to refer to the same or like parts.

Figure 2:
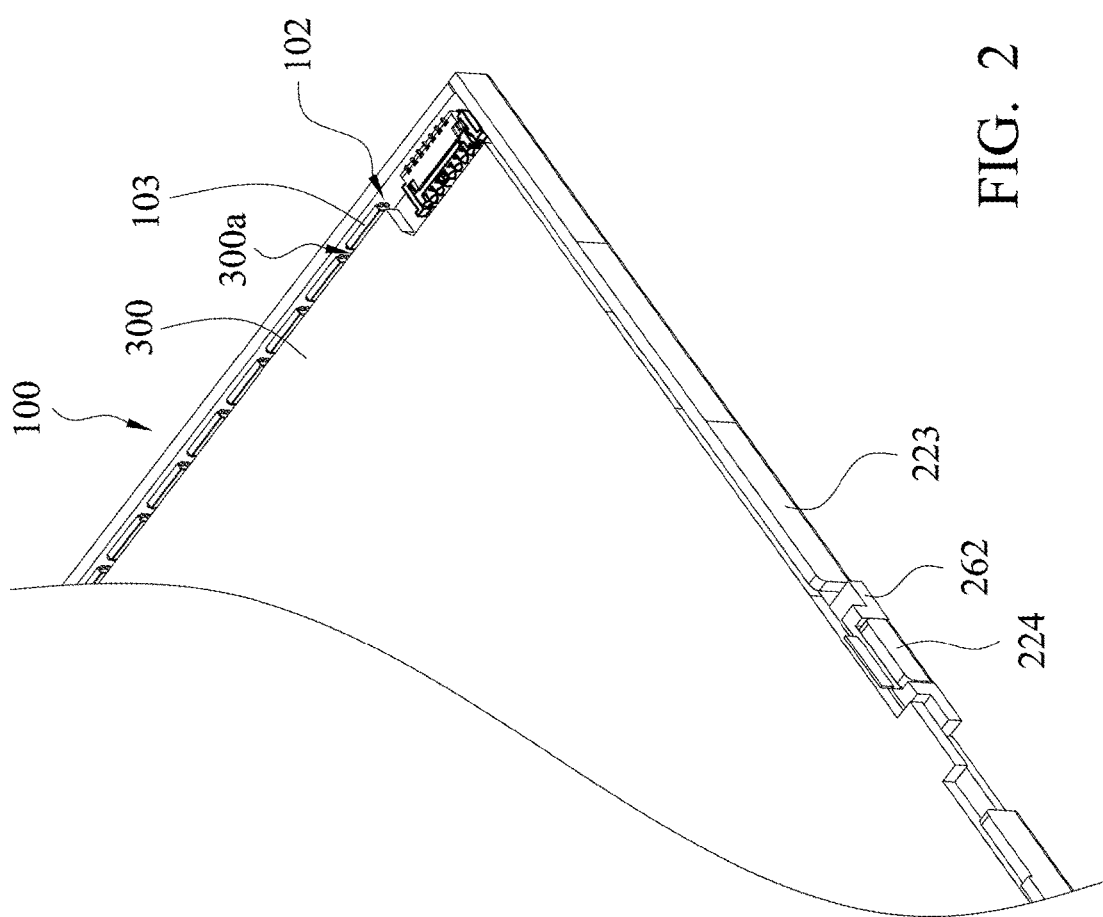
FIG. 2 is a schematic structural diagram showing a partial enlargement of a backlight module in accordance with a first embodiment of the present invention.
Figure 3A:
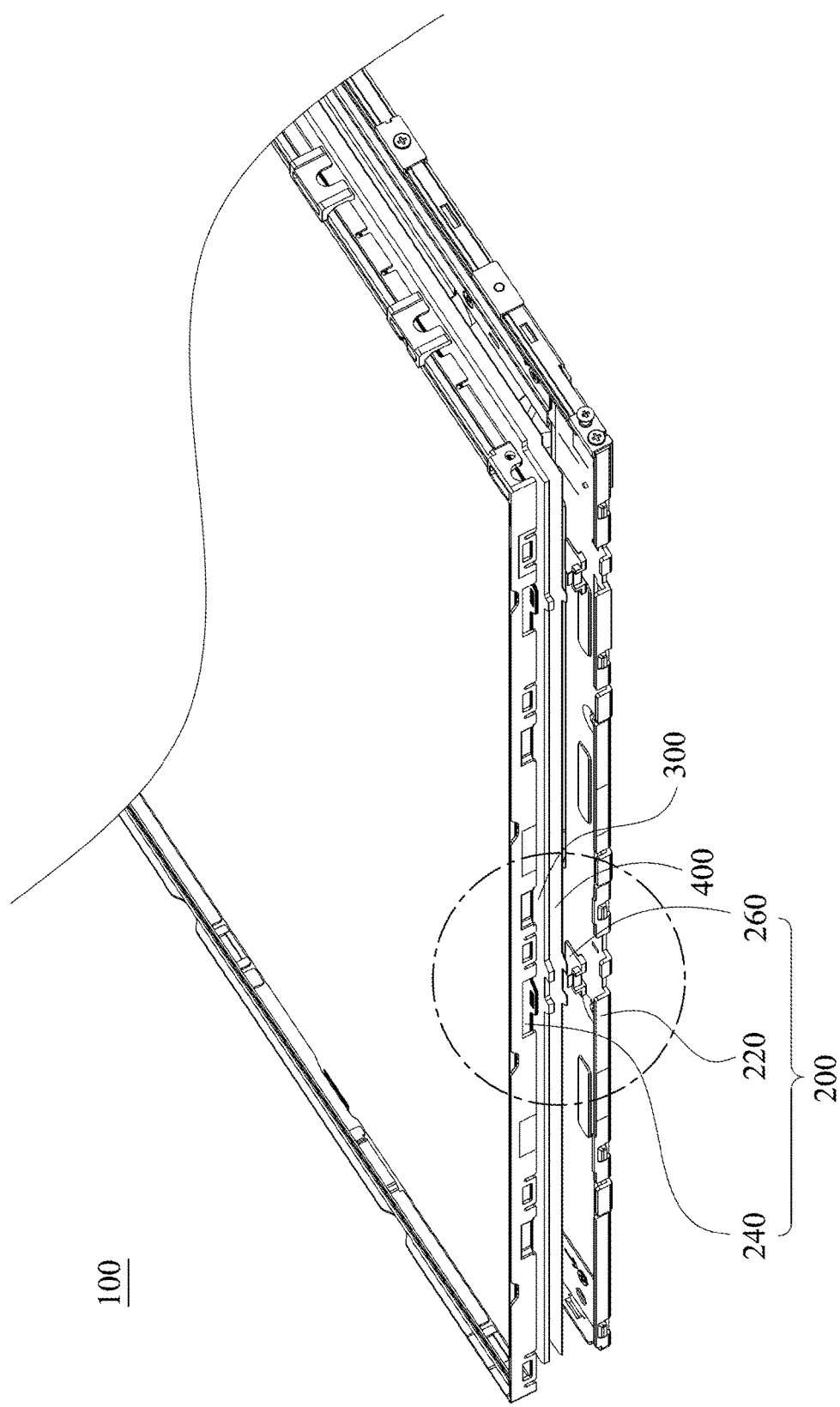
FIG. 3A is a schematic exploded view showing the backlight module in accordance with the first embodiment of the present invention.
Figure 3B:
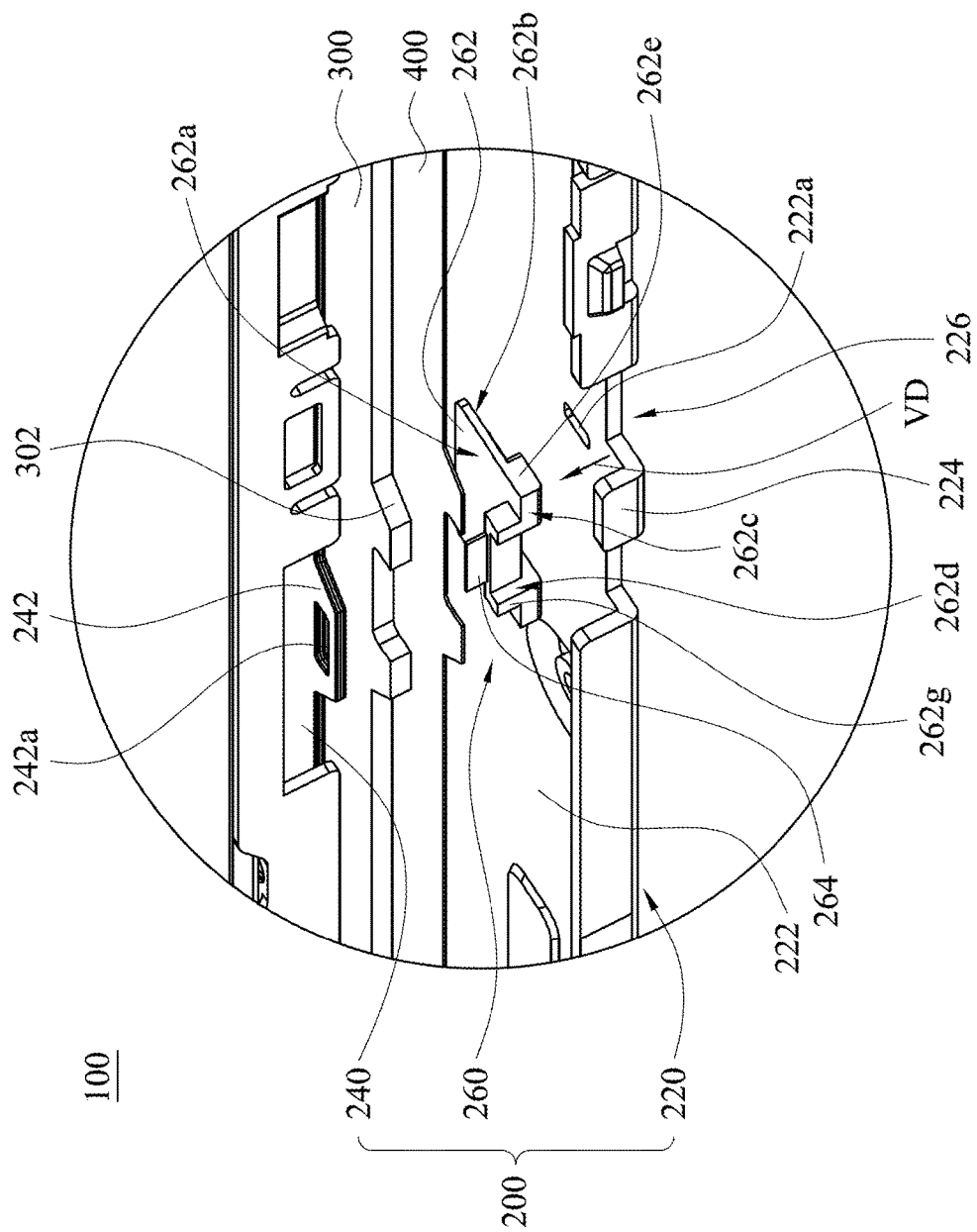
FIG. 3B is a schematic structural diagram showing a partial enlargement of FIG. 3A.

Simultaneously referring to FIG. 2, FIG. 3A and FIG. 3B, FIG. 2 is a schematic structural diagram showing a partial enlargement of a backlight module 100 in accordance with a first embodiment of the present invention, FIG. 3A is a schematic exploded view showing the backlight module 100 in accordance with the first embodiment of the present invention, and FIG. 3B is a schematic structural diagram showing a partial enlargement of FIG. 3A. In the present embodiment, the backlight module 100 mainly includes a back plate assembly 200, a light guide plate 300, a light source 102 and a reflecting film 400. As shown in FIG. 2, the light source 102 is disposed adjacent to a light-incident surface 300a of the light guide plate 300, in which the light source 102 includes a plurality of light emitting diodes 103 assembled on a printed circuit board (PCB). As shown in FIG. 3B, the back plate assembly 200 includes a back plate 220, at least one optical film 240 and at least one fixing member 260. The back plate 220 includes a bottom plate 222 and sidewalls 223 and 224 connected to the bottom plate 222, in which the sidewall 224 extends from the bottom plate 222 along a longitudinal direction VD and is used to combine with the fixing member 260. Moreover, the reflecting film 400, the light guide plate 300 and the optical film 240 are sequentially disposed on the bottom plate 222. The fixing member 260 is used to limit the light guide plate 300 and the reflecting film 400 and to fix the optical film 240 on the back plate 220. In some embodiments, the back plate 220 is rectangular and has four sides, such as two opposite long sides and two opposite short sides. The light source 102 is disposed on one of the long sides of the back plate 220, and the fixing member 260 can be disposed on the other long side or/and the short sides.

Figure 4:
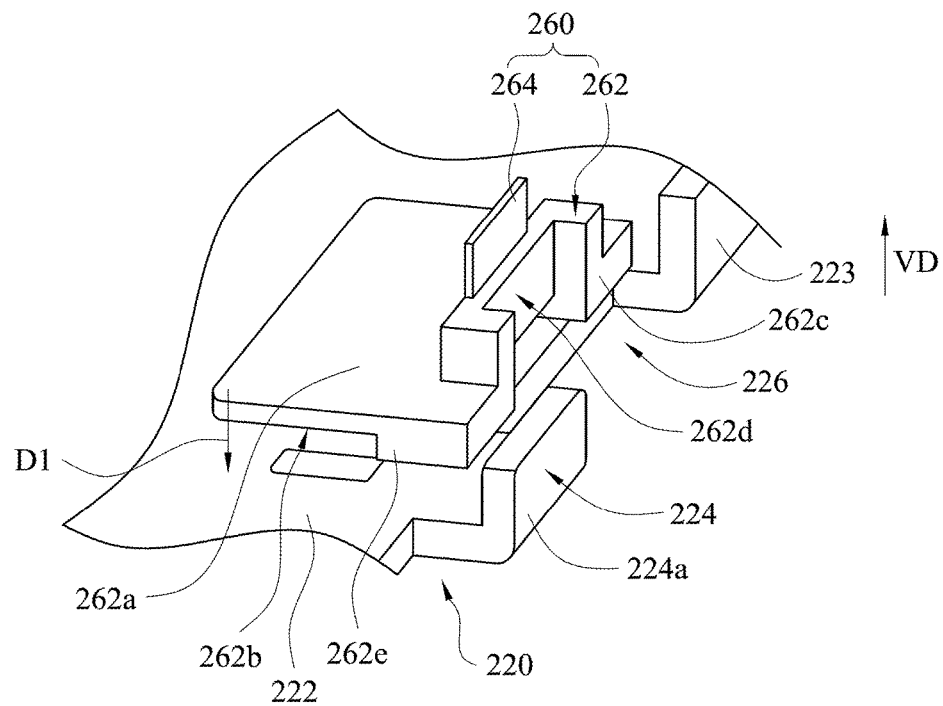
FIG. 4 is a schematic exploded view showing a fixing member and a back plate in accordance with the first embodiment of the present invention.
Figure 5:
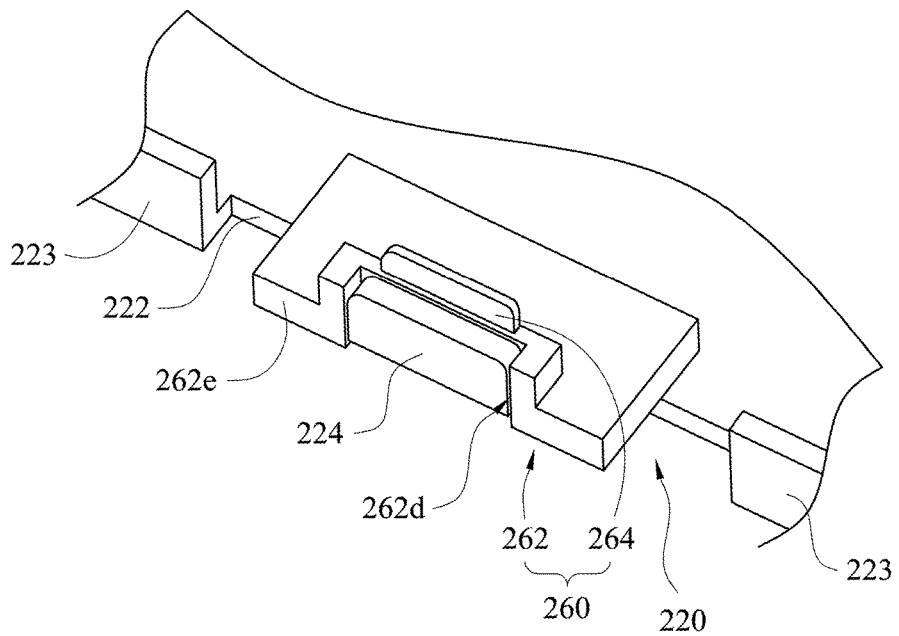
FIG. 5 is an assembling view showing the fixing member and the back plate in accordance with the first embodiment of the present invention.

Simultaneously referring to FIG. 4 and FIG. 5, FIG. 4 and FIG. 5 are a schematic exploded view and an assembling view showing the fixing member 260 and the back plate 220 in accordance with the first embodiment of the present invention. The fixing member 260 includes a main body 262, at least one first engaging portion 262d and a protruding member 264. As shown in FIG. 4, the main body 262 includes a top surface 262a, a bottom surface 262b and a side surface 262c. The bottom surface 262b is opposite to the top surface 262a, and the side surface 262c connects the top surface 262a to the bottom surface 262b. In addition, the main body 262 has at least one fixing portion 262e. The first engaging portion 262d is disposed on the main body 262. The first engaging portion 262d extends along the longitudinal direction VD and is combined with the sidewall 224 which extends long the longitudinal direction VD. Moreover, the sidewall 224 has at least one second engaging portion 224a, and the second engaging portion 224a is able to be combined with the first engaging portion 262d, and a top surface of the second engaging portion 224a is uncovered. In one embodiment, the first engaging portion 262d is a guiding groove, and the number of the first engaging portion 262d is 1. The second engaging portion 224a is a protruding structure, and the number of the second engaging portion 224a is 1. In the present embodiment, the guiding groove 262d is a recess portion formed at the side surface 262c of the main body 262. Therefore, when being fixed on the back plate 220, the fixing member 260 is moved along a direction D1 towards the bottom plate 222, so that the sidewall 224 can slide along the guiding groove 262d to be fixed (inlaid) in the guiding groove 262d. In other words, a portion of the main body 262 of the fixing member 260 overlaps with the sidewall 224 of the back plate 220.

Referring to FIG. 4 and FIG. 5 again, the fixing portion 262e of the main body 262 protrudes from the bottom surface 262b of the main body 262. A slot 226 is disposed on the bottom plate 222 of the back plate 220 corresponding to the fixing portion 262e. Therefore, the fixing member 260 can be fixed on the back plate 220 by inserting the fixing portion 262e into the slot 226 along the direction D1. In some embodiments, in a process of fabricating the back plate 220, a stamping process is performed to form plural slots 226 on a plate. Then, a portion of the plate without the slots 226 near a side edge of the plate is bent upwards to form the sidewalls 223 and 224, in which the other portion of the plate is defined as the bottom plate 222. Therefore, as shown in FIG. 5, when the fixing member 260 is fixed on the back plate 220, the fixing portion 262e can fill in the space of the slot 226, so as to save the space and increase the strength of the back plate 220. In some embodiments, when the fixing member 260 is fixed on the back plate 220, the main body 262 does not contact the sidewall 223 (as shown in FIG. 5). In other embodiments, when the fixing member 260 is fixed on the back plate 220, one side or both sides of the main body 262 can abut against the sidewall 223 (as shown in FIG. 2) to limit the position of the fixing member 260.

Figure 6:
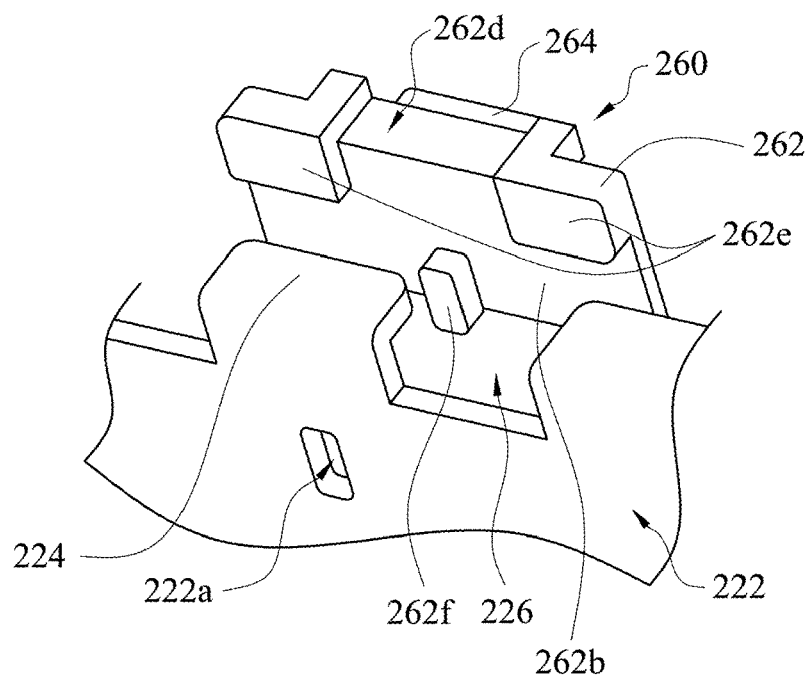
FIG. 6 is another schematic exploded view showing the fixing member and the back plate in accordance with the first embodiment of the present invention.

Simultaneously referring to FIG. 6, FIG. 6 is another schematic exploded view showing the fixing member 260 and the back plate 220 in accordance with the first embodiment of the present invention. In some embodiments, the main body 262 includes an inserting member 262f disposed on the bottom surface 262b, and the bottom plate 222 includes an insert hole 222a corresponding to the inserting member 262f. Therefore, the fixing member 260 can be fixed on the back plate 220 by inserting the inserting member 262f into the insert hole 222a.

Figure 7:
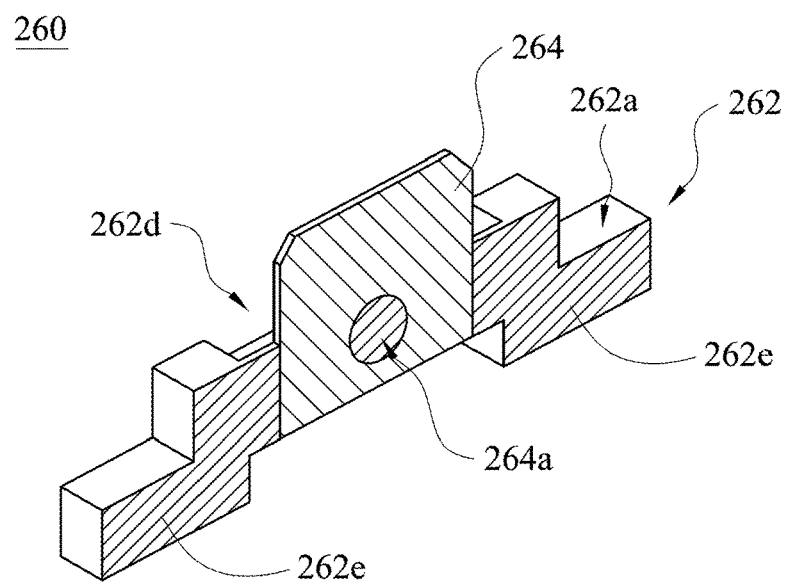
FIG. 7 is a schematic cross-sectional view showing the fixing member in accordance with the first embodiment of the present invention.

Referring to FIG. 4 and FIG. 7, FIG. 7 is a schematic cross-sectional view showing the fixing member 260 in accordance with the first embodiment of the present invention. In the present embodiment, the protruding member 264 is combined with the main body 262 and protrudes from the top surface 262a of the main body 262. In some embodiments, the protruding member 264 is a metal plate or formed from another material with high strength, such as a SGCC galvanized steel plate or an iron plate. Meanwhile, the main body 262 is formed from polycarbonate (PC). In a process of fabricating the fixing member 260 of the present embodiment, as shown in FIG. 7, after a through hole 264a is formed on the protruding member 264, a gauge is used to fix the protruding member 264. Then, an injection molding manner is used to inject a material used to form the main body 262 into a mold to cover a portion of the protruding member 264, so as to combine the protruding member 264 with the main body 262. Meanwhile, in the fabricating process, the material used to form the main body 262 flows into the through hole 264a of the protruding member 264, so as to increase the jointing strength between the protruding member 264 and the main body 262.

Figure 8:
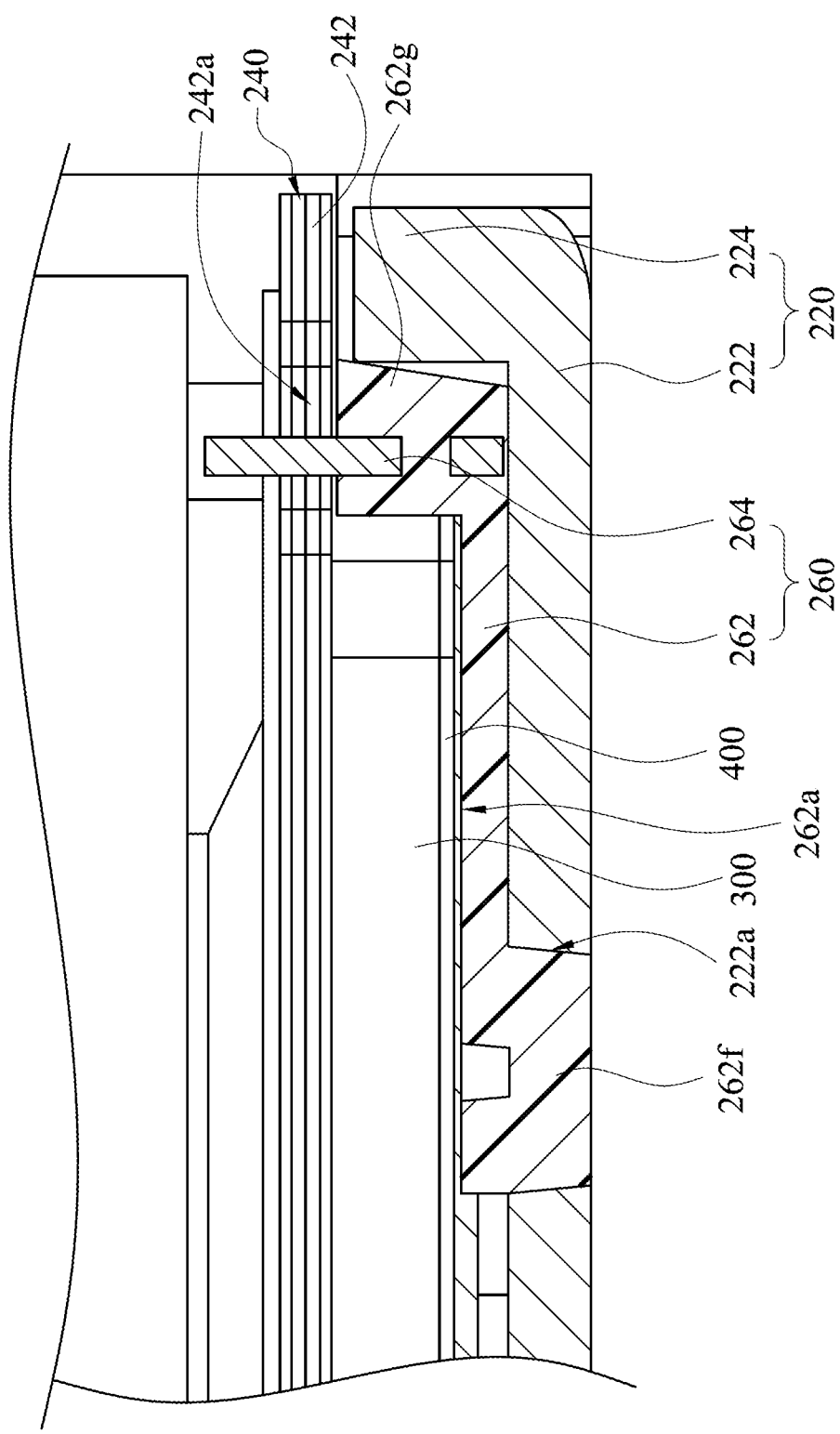
FIG. 8 is a schematic cross-sectional view showing the backlight module in accordance with the first embodiment of the present invention.
Figure 9:
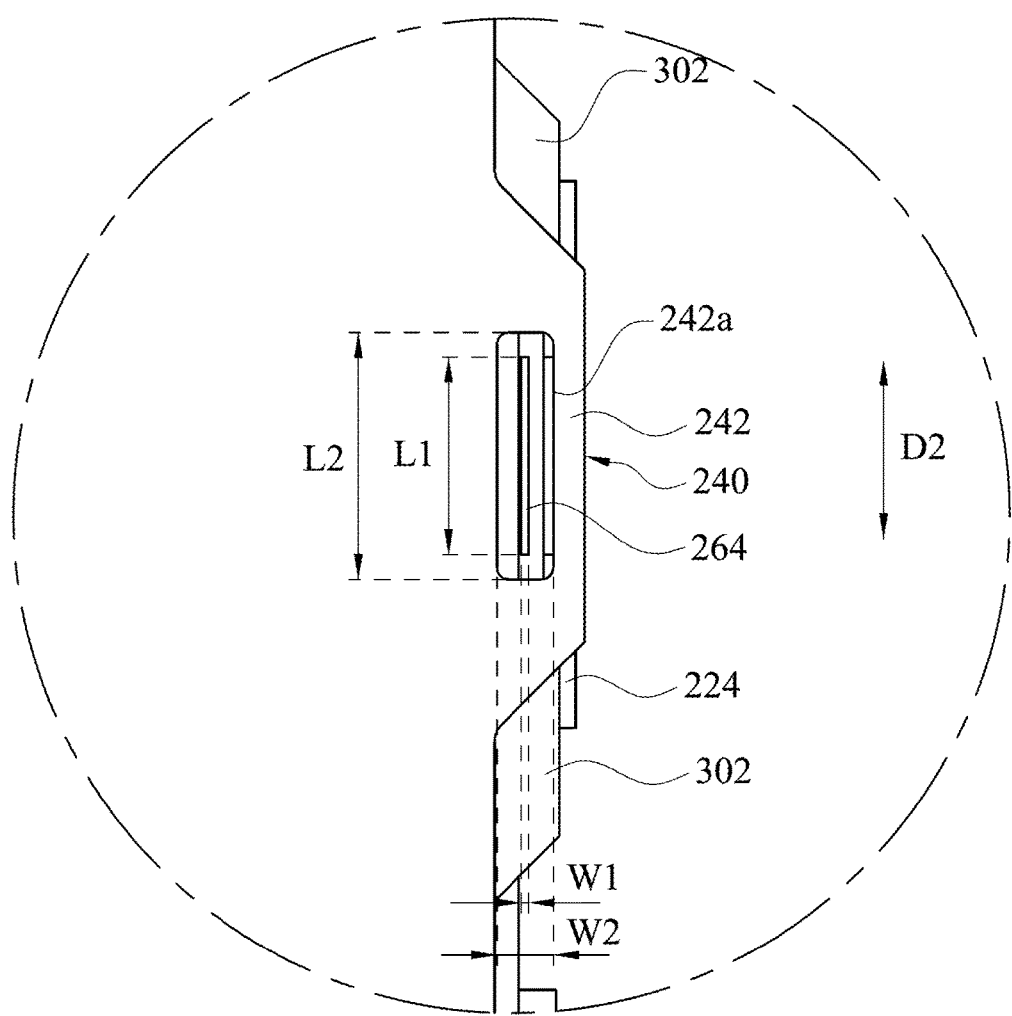
FIG. 9 is a schematic top view showing the backlight module in accordance with the first embodiment of the present invention.

Simultaneously referring to FIG. 3B, FIG. 8 and FIG. 9, FIG. 8 and FIG. 9 are schematic cross-sectional and top views showing the backlight module in accordance with the first embodiment of the present invention. Besides the protruding member 264 of the fixing member 260 can be used to fix the optical film 240, the fixing member 260 itself also can limit the light guide plate 300 and the reflecting film 400. As shown in FIG. 3B, in one embodiment, the light guide plate 300 has at least one flange lug 302 extending from the side edge of the light guide plate 300. When the light guide plate 300 is disposed on the bottom plate 222, the flange lug 302 is located on the top surface 262a of the main body 262, and is staggered arranged with the protruding member 264. In other embodiments, the main body 262 includes a projection 262g disposed on the top surface 262a, and the projection 262g covers a portion of the protruding member 264. The light guide plate 300 can be limited by the flange lug 302 abutting against the projection 262g, so as to prevent the light guide plate 300 from being damaged during transportation. In addition, the projection 262g also can prevent the side edge of the light guide plate 300 from colliding with the protruding member 264. In the present embodiment, the reflecting film 400 is disposed on a bottom surface of the light guide plate 300 and has the same shape and dimension with the light guide plate 300, so that light emitted to the bottom surface of the light guide plate 300 can be effectively reflected.

Referring to FIG. 3B, FIG. 8 and FIG. 9 again, the optical film 240 is disposed on the reflecting film 400 and the light guide plate 300, and is engaged with the protruding member 264 of the fixing member 260. In other words, the main body 262 of the fixing member 260 is disposed between the sidewall 224 and the optical film 240. In one embodiment, the optical film 240 includes at least one flange lug 242 extending from a side edge of the optical film 240. The flange lug 242 has a through hole 242a. Therefore, when the optical film 240 is disposed on the fixing member 260, the protruding member 264 passes through the through hole 242a of the flange lug 242.

As shown in FIG. 8 and FIG. 9, in one embodiment, the protruding member 264 is a rectangular plate with a length L1 and a width W1. An extending direction of the length L1 is parallel to an extending direction D2 of the sidewall 224. Moreover, the through hole 242a of the optical film 240 is a rectangular hole with a length L2 and a width W2. An extending direction of the length L2 is parallel to the extending direction D2 of the sidewall 224, so that the length L2 is parallel to the length L1 of the protruding member 264. In addition, the length L2 and the width W2 of the through hole 242a are greater than the length L1 and the width W1 of the protruding member 264 respectively. In other words, when the optical film 240 is engaged with the protruding member 264, the protruding member 264 does not contact the inner wall of the through hole 242a, and there is a distance between the protruding member 264 and the inner wall of the through hole 242a. Such distance design provides tolerance for allowing the optical film 240 to expand therein, so as to prevent the optical film 240 from being limited by the length L1 or the width W1 of the protruding member 264 and deformed due to the heat or moisture absorption. The design of the rectangular plate can increase the assembling area between the optical film 240 and the protruding member 264, thus increasing the stability of the optical film 240 disposed on the fixing member 260. On the other hand, the design of the rectangular plate also can increase the contact area between the protruding member 264 and the main body 262, thus increasing the jointing strength between the protruding member 264 and the main body 262.

Figure 10A:
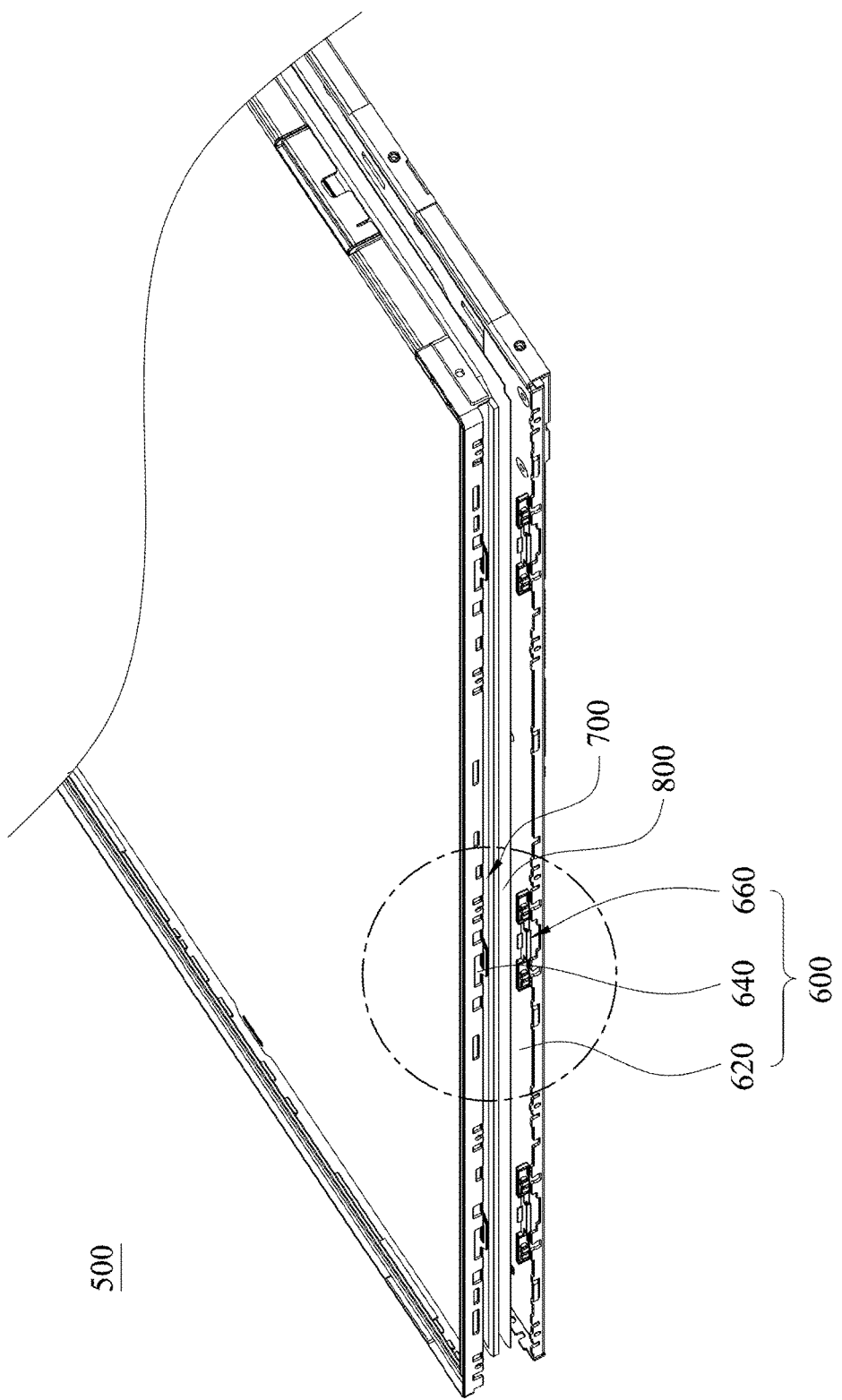
FIG. 10A is a schematic exploded view showing a backlight module in accordance with a second embodiment of the present invention.
Figure 10B:
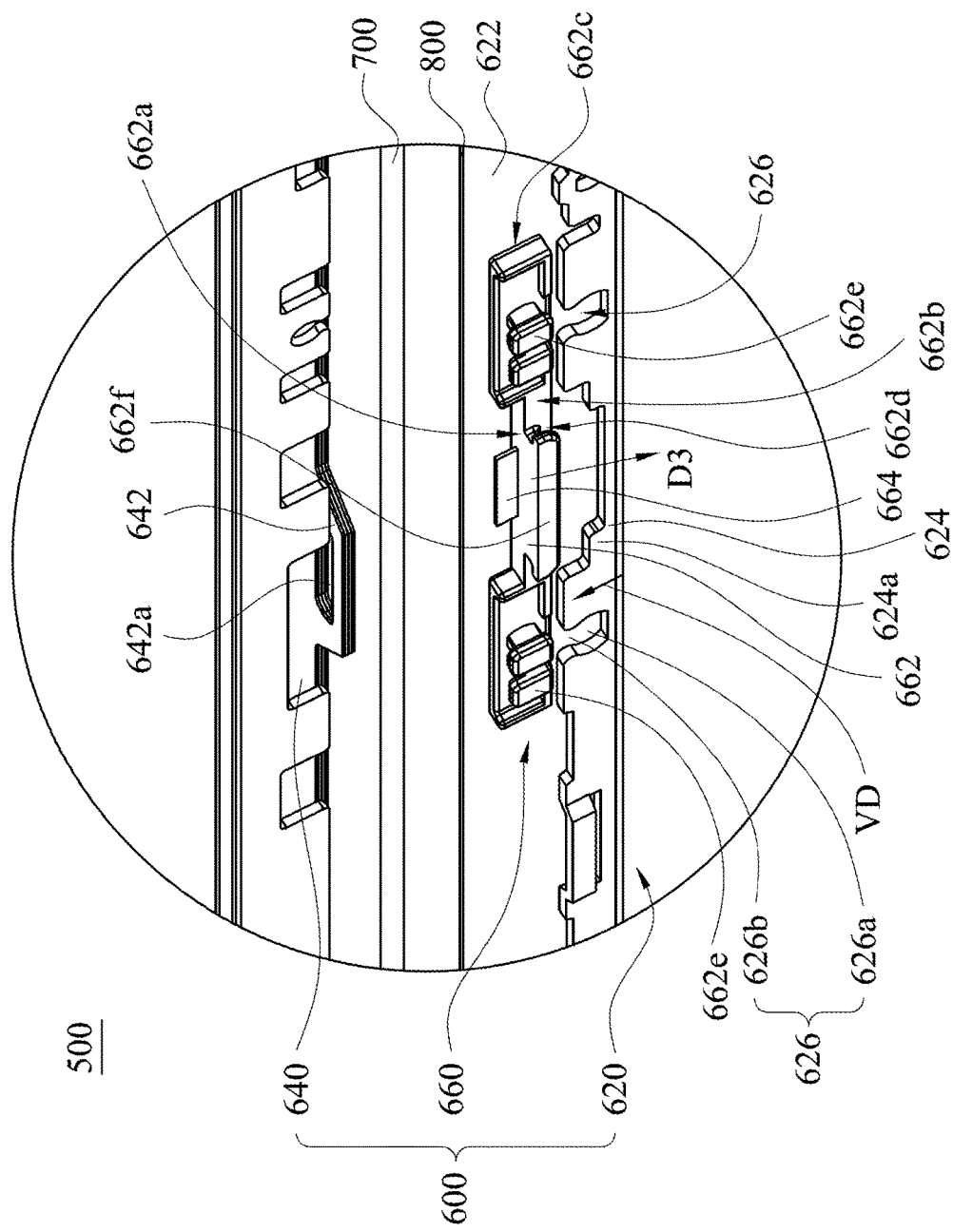
FIG. 10B is a schematic structural diagram showing a partial enlargement of FIG. 10A.

In the present invention, the fixing member 260 has various designs. Simultaneously referring to FIG. 10A and FIG. 10B, FIG. 10A is a schematic exploded view showing a backlight module 500 in accordance with a second embodiment of the present invention, and FIG. 10B is a schematic structural diagram showing a partial enlargement of FIG. 10A. In the present embodiment, the backlight module 500 mainly includes a back plate assembly 600, a light guide plate 700, a light source (not shown) and a reflecting film 800. The disposition of the light source in the present embodiment is similar to the disposition of the light source 102 in FIG. 2, and is not described again herein. As shown in FIG. 10B, the back plate assembly 600 includes a back plate 620, at least one optical film 640 and at least one fixing member 660. The back plate 620 includes a bottom plate 622 and a sidewall 624 connected to the bottom plate 622, in which the sidewall 624 extends from the bottom plate 622 along a longitudinal direction VD. Moreover, the reflecting film 800, the light guide plate 700 and the optical film 640 are sequentially disposed on the bottom plate 622. Similarly, the fixing member 660 is used to limit the light guide plate 700 and the reflecting film 800 and fix the optical film 640 on the back plate 620.

Figure 11:
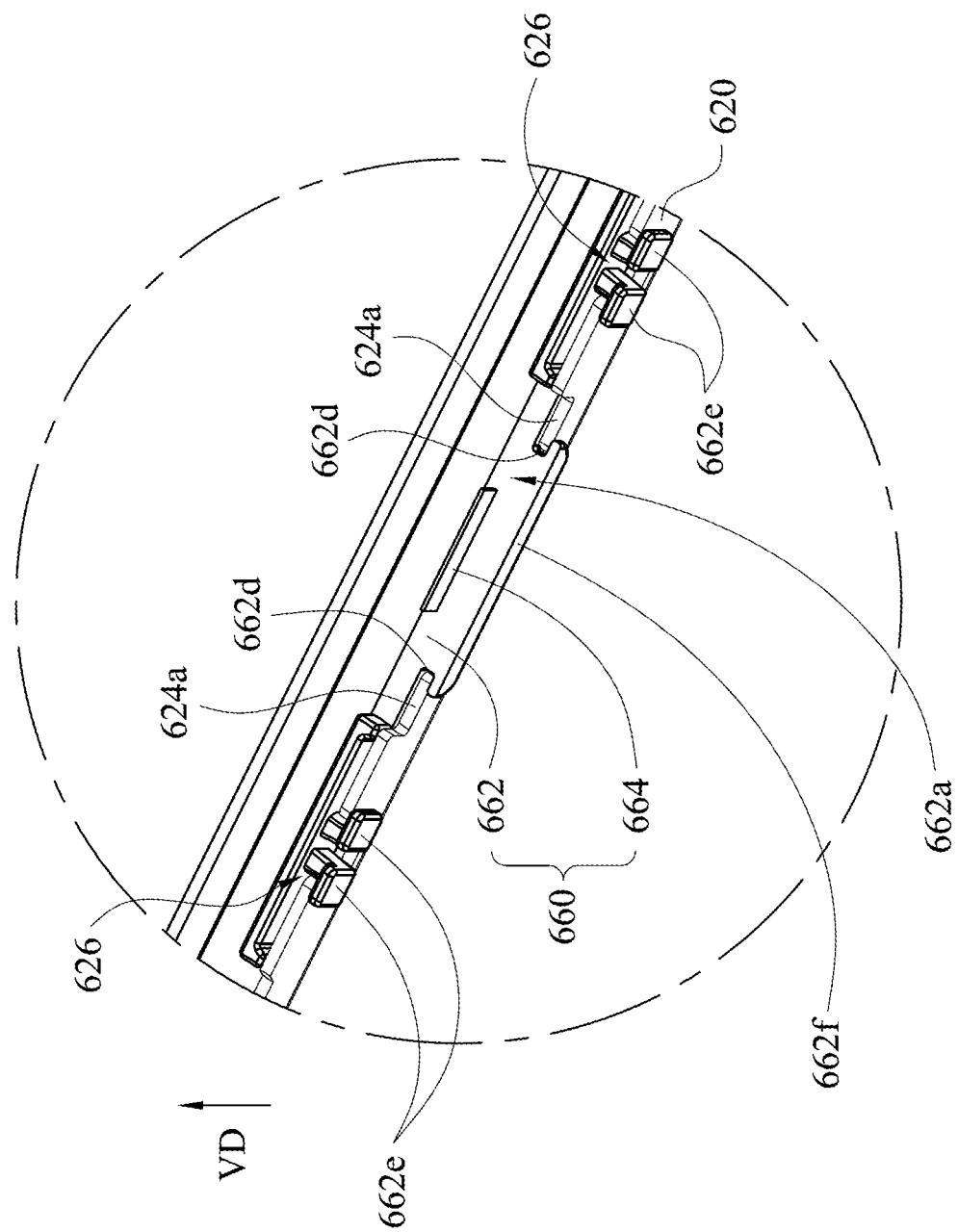
FIG. 11 is an assembling view showing the fixing member and the back plate in accordance with the second embodiment of the present invention.

Simultaneously referring to FIG. 10B and FIG. 11, FIG. 11 is an assembling view showing the fixing member 660 and the back plate 620 in accordance with the second embodiment of the present invention. The fixing member 660 includes a main body 662, at least one first engaging portion 662d and a protruding member 664. As shown in FIG. 10B, the main body 662 includes a top surface 662a, a first side surface 662b and a second side surface 662c. The first side surface 662b is opposite to the second side surface 662c, and the top surface 662a connects the first side surface 662b to the second side surface 662c, in which the aforementioned first side surface 662b is a surface near the sidewall 624 of the back plate 620. As shown in FIG. 10B, the main body 662 has at least one fixing portion 662e and an extending portion 662f. The first engaging portion 662d is recessed in the main body 662, and the first engaging portion 662d extends along the longitudinal direction VD and is combined with the sidewall 624 which extends long the longitudinal direction VD. Moreover, the sidewall 624 has at least one second engaging portion 624a, and the second engaging portion 624a is able to be combined with the first engaging portion 662d, and a top surface of the second engaging portion 624a is uncovered (as shown in FIG. 11). In one embodiment, the first engaging portion 662d is a guiding groove, and the number of the first engaging portion 662d is 2. The second engaging portion 624a is a protruding structure, and the number of the second engaging portion 624a is 2. In the present embodiment, the fixing portion 662e and the extending portion 662f are disposed on the main body 662 and protrude from the first side surface 662b of the main body 662. Moreover, the first engaging portion 662d is formed at and recessed into the extending portion 662f to form a guiding groove. In the present embodiment, an opening of the guiding groove 662d faces toward the bottom plate 622 of the back plate 620. Therefore, while being installed on the back plate 620, the fixing member 660 is moved along a direction D3 towards the bottom plate 622, so that the sidewall 624 can slide along the guiding groove 662d to be fixed (inlaid) in the guiding groove 662d. In other words, at least one portion of fixing member 660 of the main body 662 overlaps with the sidewall 624 of the back plate 620.

Referring to FIG. 10B and FIG. 11, the fixing portion 662e of the main body 662 protrudes from the first side surface 662b of the main body 662. A slot 626 is disposed on the sidewall 624 of back plate 620 corresponding to the fixing portion 662e. The slot 626 includes a positioning portion 626a and a taper portion 626b connected to the positioning portion 626a. Moreover, the fixing portion 662e is elastic. Therefore, while the fixing member 660 is being installed on the back plate 620 along the direction D3, the fixing portion 662e is compressed and deformed by the taper portion 626b, thereby fixing the fixing portion 662e in the positioning portion 626a by a resilient recovery force. In one example, the fixing portion 662e includes two convex posts spaced from each other. While the fixing member 660 is being installed on the back plate 620, the two convex posts are compressed by the taper portion 626b and moves closer to each other. Then, after being moved to the positioning portion 626a, the two convex posts return to their original positions by the resilient recovery force, so as to be fixed in the positioning portion 626a. Therefore, the fixing member 660 can be fixed on the back plate 620 by locking the fixing portion 662e into the slot 626.

In some embodiments, in a process of fabricating the back plate 620, a stamping process is used to form plural slots 626 on a plate. Then, a portion of the plate disposed with the slots 626 near a side edge of the plate is bent upwards to form the sidewall 624, in which the other portion of the plate is defined as the bottom plate 622. Therefore, as shown in FIG. 11, when the fixing member 660 is fixed on the back plate 620, the fixing portion 662e can fill in the space of the slot 626, so as to save the space and increase the strength of the back plate 620.

As shown in FIG. 11, in the present embodiment, the protruding member 664 is combined with the main body 662 and protrudes from the top surface 662a of the main body 662. It is noted that the material and the process for forming the fixing member 660 of the present embodiment are similar to the aforementioned fixing member 260, and are not described again herein.

Figure 12:
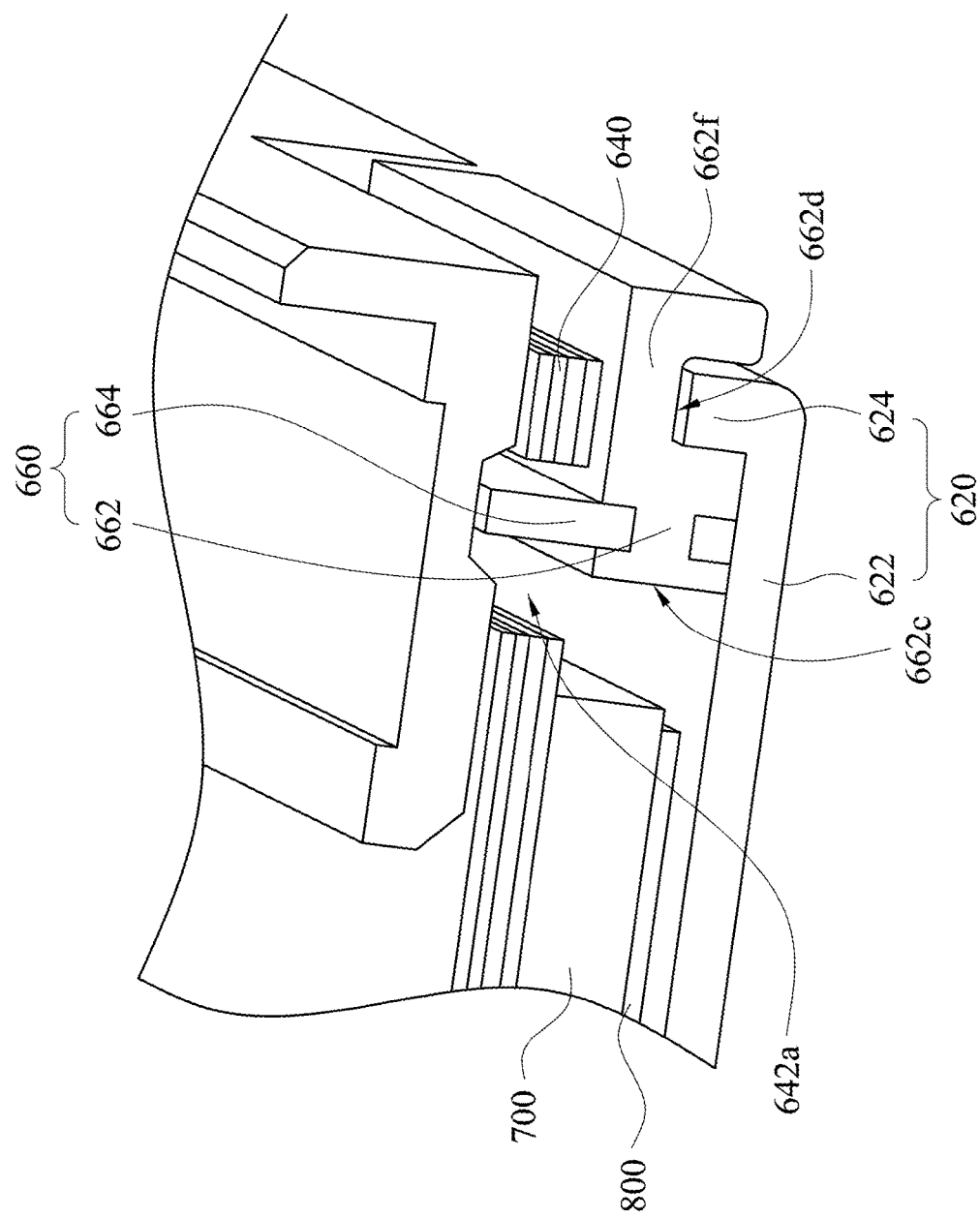
FIG. 12 is a schematic cross-sectional view showing the backlight module in accordance with the second embodiment of the present invention.
Figure 13:
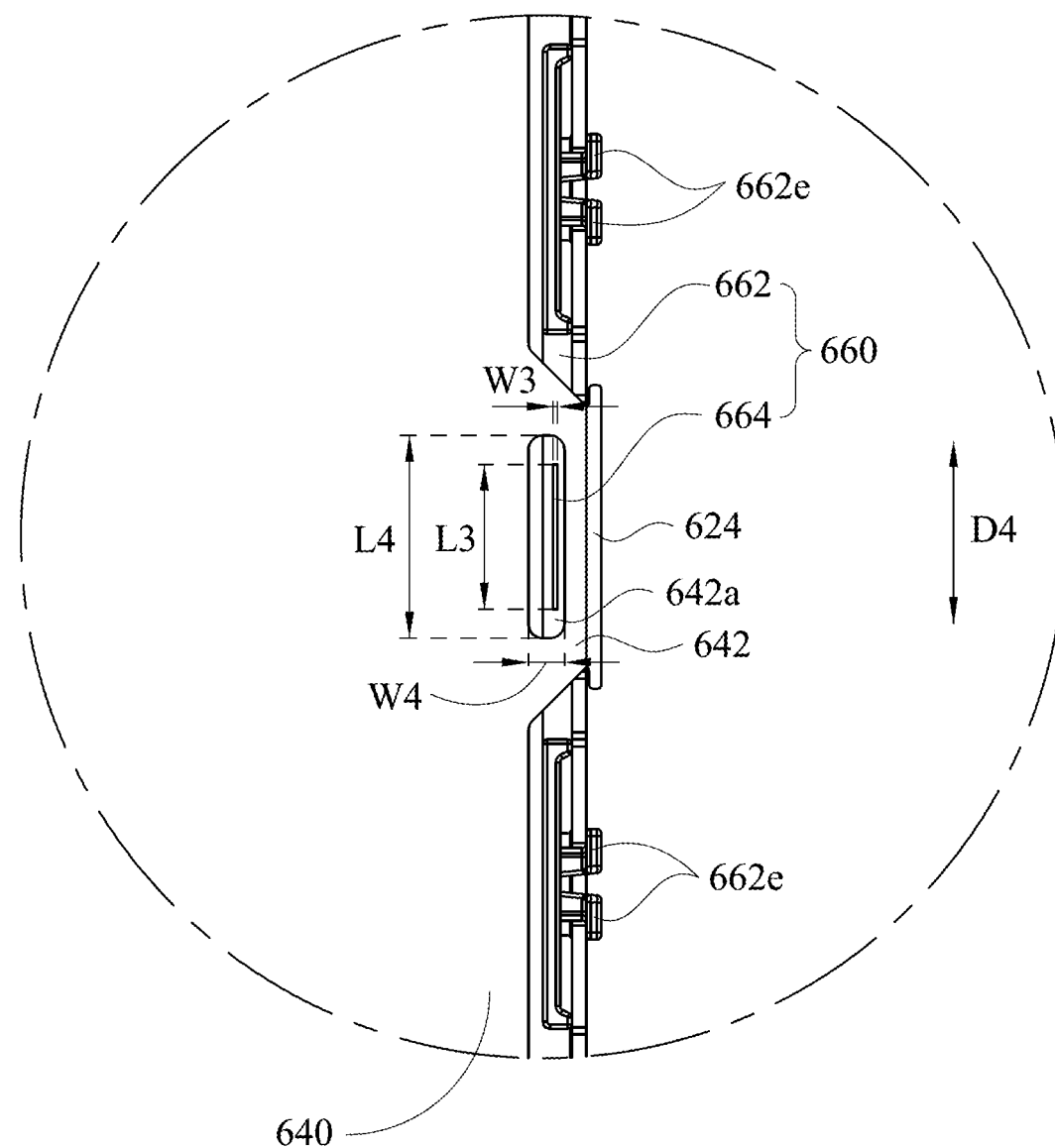
FIG. 13 is a schematic top view showing the backlight module in accordance with the second embodiment of the present invention.

Referring to FIG. 10B, FIG. 12 and FIG. 13, FIG. 12 and FIG. 13 are schematic cross-sectional and top views showing the backlight module in accordance with the second embodiment of the present invention. Besides the protruding member 664 of the fixing member 660 can be used to fix the optical film 640, the fixing member 660 itself also can limit the light guide plate 700 and the reflecting film 800. As shown in FIG. 10B, in one embodiment, when the light guide plate 700 is disposed on the bottom plate 622, a side edge of the light guide plate 700 can abut against the second side surface 662c of the main body 662, so as to limit the light guide plate 700. In addition, the protruding member 664 is combined with the main body 662 and protrudes from the top surface 662a of the main body 662, so as to prevent the side edge of the light guide plate 700 from colliding with the protruding member 264. In the present embodiment, the reflecting film 800 is disposed on a bottom surface of the light guide plate 700 and has the same shape and dimension with the light guide plate 700, so that light emitted to the bottom surface of the light guide plate 700 can be effectively reflected. It is noted that, in order to meet different design requirements, the light guide plate 700 does not directly contact the second side surface 662c of the main body 662, and there is a distance between the second side surface 662c and the light guide plate 700.

Referring to FIG. 10, FIG. 12 and FIG. 13 again, the optical film 640 is disposed on the reflecting film 800 and the light guide plate 700, and is engaged with the protruding member 664 of the fixing member 660. In other words, the main body 662 of the fixing member 660 is disposed between the sidewall 624 and the optical film 640. In some embodiments, the optical film 640 includes at least one flange lug 642 extending from a side edge of the optical film 640. The flange lug 642 has a through hole 642a. Therefore, when the optical film 640 is disposed on the fixing member 660, the protruding member 664 passes through the through hole 642a of the flange lug 642.

As shown in FIG. 12 and FIG. 13, in one embodiment, the protruding member 664 is a rectangular plate with a length L3 and a width W3. An extending direction of the length L3 is parallel to an extending direction D4 of the sidewall 624. Moreover, the through hole 642a of the optical film 640 is a rectangular hole with a length L4 and a width W4. An extending direction of the length L4 is parallel to the extending direction D4 of the sidewall 624, so that the length L4 is parallel to the length L3 of the protruding member 664. In addition, the length L4 and the width W4 of the through hole 642a are greater than the length L3 and the width W3 of the protruding member 664 respectively. In other words, when the optical film 640 is engaged with the protruding member 664, the protruding member 664 does not contact the inner wall of the through hole 642a, and there is a distance between the protruding member 664 and the inner wall of the through hole 642a. Such distance design provides tolerance for allowing the optical film 640 to expand therein, so as to prevent the optical film 640 from being limited by the length L3 or the width W3 of the protruding member 664 and deformed due to the heat or moisture absorption. The design of the rectangular plate can increase the assembling area between the optical film 640 and the protruding member 664, thus increasing stability of the optical film 640 disposed on the fixing member 660. On the other hand, the design of the rectangular plate also can increase the contact area between the protruding member 664 and the main body 662, thus increasing the jointing strength between the protruding member 664 and the main body 662.

According to the aforementioned embodiments of the present invention, the fixing member having the guiding groove and the fixing portion is used to fix the optical film and the light guide plate on the back plate. Moreover, the slot corresponding to the fixing portion is disposed on the back plate. Therefore, when the fixing member is disposed on the back plate, the sidewall of the back plate can be fixed in the guiding groove, and the fixing portion can fill in the space of the slot, so as to achieve an effect of saving the space and increasing the strength of the back plate.

According to the aforementioned embodiments of the present invention, an injection molding manner is used to form the fixing member of the present invention for combining the protruding member having higher strength with the main body, so as to increase the overall strength of the fixing member and the reliability of the optical film disposed on the fixing member. In addition, the size of the through hole of the optical film can be designed according to the length and the width of the protruding member, so as to provide tolerance for allowing the optical film to expand therein due to the heat or moisture absorption, and prevent the optical from being deformed by compression.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame assembly, comprising:
   a frame comprising a holding plate and a sidewall, wherein the sidewall extends from the holding plate along a longitudinal direction, wherein the sidewall of the frame is connected to the holding plate of the frame, and at least one slot is disposed on the frame;
   at least one optical film; and
   at least one fixing member, comprising:
      a main body;
      and
         a protruding member which is disposed on the main body and is combined with the at least one optical film;
   wherein the main body comprises:
   a top surface, wherein the protruding member protrudes from the top surface; and
   a first side surface, wherein at least one fixing portion protrudes from the first side surface;
   wherein the fixing portion is elastic and deformable by being compressed by the frame when the fixing portion is directly contacted with the frame, so as to be fixed in the at least one slot by a resilient recovery force.

2. The frame assembly of claim 1, wherein the fixing member is movable along a direction towards the holding plate so as to be combined with the holding plate, and the protruding member of the fixing member extends along a direction away from the holding plate so as to be combined with the optical film.

3. The frame assembly of claim 1, wherein the protruding member has a length and a width, and an extending direction of the length is parallel to an extending direction of the sidewall.

4. The frame assembly of claim 3, wherein the optical film has a through hole with a length, wherein an extending direction of the length of the through hole is parallel to the extending direction of the length of the protruding member.

5. The frame assembly of claim 4, wherein the through hole of the optical film has a width, and the width of the through hole is greater than the width of the protruding member.

6. The frame assembly of claim 1, wherein the protruding member has higher strength than the main body, and the main body is combined with the protruding member by an injection molding manner.

7. The frame assembly of claim 1, wherein the main body further comprises an extending portion, wherein
   the at least one fixing portion and the extending portion respectively protrude from the first side surface, wherein the slot of the frame is disposed on the sidewall corresponding to the fixing portion, and a guiding groove is formed at the extending portion.

8. The frame assembly of claim 7, wherein the slot of the frame comprises a positioning portion and a taper portion connected to the positioning portion, and the fixing portion is elastic and deformable by being compressed by the taper portion, so as to be fixed in the positioning portion by a resilient recovery force.

9. The frame assembly of claim 1, wherein at least one first engaging portion is located on the main body, extends along the longitudinal direction, and is combined with the sidewall which extends along the longitudinal direction, and wherein the sidewall has at least one second engaging portion which is able to be combined with the at least one first engaging portion, and a top surface of the at least one second engaging portion is uncovered.

10. The frame assembly of claim 9, wherein the at least one first engaging portion is a guiding groove, and the at least one second engaging portion is a protruding structure, and the number of the at least one first engaging portion is equal to the number of the at least one second engaging portion, and the at least one second engaging portion is inlaid in the at least one first engaging portion.

11. A backlight module, comprising:
a frame assembly of claim 1;
a light guide plate disposed between the holding plate and the optical film, wherein the light guide plate comprises at least one flange lug extending from a side edge of the light guide plate, and the flange lug is staggered arranged with the protruding member; and
a light source disposed adjacent to a light-incident surface of the light guide plate.

12. A backlight module, comprising:
a frame assembly of claim 1;
a light guide plate disposed between the holding plate and the optical film, wherein the light guide plate abuts against the main body; and
a light source disposed adjacent to a light-incident surface of the light guide plate.

13. A backlight module, comprising:
a frame assembly of claim 1;
a light guide plate disposed between the holding plate and the optical film; and
a light source disposed adjacent to a light-incident surface of the light guide plate.

* * * * *